US012427350B2

(12) United States Patent
Altmueller et al.

(10) Patent No.: US 12,427,350 B2
(45) Date of Patent: Sep. 30, 2025

(54) LANCE, IN PARTICULAR EXTINGUISHING LANCE FOR FIGHTING FIRES

(71) Applicant: Rosenbauer International AG, Leonding (AT)

(72) Inventors: Martin Altmueller, Bad Leonfelden (AT); Florian Kiesenhofer, St. Leonhard bei Freistadt (AT); Gerhard Lesterl, Katsdorf (AT); Roland Weber, Oftering (AT)

(73) Assignee: Rosenbauer International AG, Leonding (AT)

( * ) Notice: Subject to any disclaimer, the term of this patent is extended or adjusted under 35 U.S.C. 154(b) by 743 days.

(21) Appl. No.: 17/779,079

(22) PCT Filed: Nov. 24, 2020

(86) PCT No.: PCT/AT2020/060417

§ 371 (c)(1),
(2) Date: May 23, 2022

(87) PCT Pub. No.: WO2021/102495

PCT Pub. Date: Jun. 3, 2021

(65) Prior Publication Data

US 2023/0001245 A1 Jan. 5, 2023

(30) Foreign Application Priority Data

Nov. 25, 2019 (AT) .............................. A 51022/2019

(51) Int. Cl.
*A62C 31/07* (2006.01)
*A62C 31/22* (2006.01)
(Continued)

(52) U.S. Cl.
CPC .............. *A62C 31/07* (2013.01); *A62C 31/22* (2013.01); *B05B 7/0408* (2013.01); *B05B 7/1218* (2013.01); *B05B 7/2445* (2013.01)

(58) Field of Classification Search
CPC ....... A62C 31/07; A62C 31/22; B05B 7/0408; B05B 7/1218; B05B 7/2445
(Continued)

(56) References Cited

U.S. PATENT DOCUMENTS 4,497,442 A 2/1985 Williams
5,725,154 A 3/1998 Jackson
(Continued)

FOREIGN PATENT DOCUMENTS

CA 2115205 A1 12/1994
CN 2605075 Y 3/2004
(Continued)

OTHER PUBLICATIONS

International Search Report in PCT/AT2020/060417, mailed Apr. 6, 2021.

*Primary Examiner* — Christopher S Kim
(74) *Attorney, Agent, or Firm* — Collard & Roe, P.C.

(57) ABSTRACT

A lance, in particular for jointly dispensing a pressurized fluid and an additive for penetrating walls, includes a lance body, a handle arrangement, multiple channels and actuator arrangements interacting therewith, a nozzle arrangement as well as at least one container for the additive. The actuator arrangements selectively control the fluid being conducted in the first channel, the additive being conducted in the second channel, and the ambient air being conducted in the third channel to a first nozzle body. The third channel forms a line connection between the ambient air and a mixing chamber of the first nozzle body. The second actuator arrangement with its second actuator directly acts on the third channel and indirectly controls the admixing of the additive via the second channel into the mixing chamber.

24 Claims, 6 Drawing Sheets

(51) Int. Cl.
*B05B 7/04* (2006.01)
*B05B 7/12* (2006.01)
*B05B 7/24* (2006.01)

(58) Field of Classification Search
USPC ................................. 239/318, 335, 340, 526
See application file for complete search history.

(56) References Cited

U.S. PATENT DOCUMENTS

| | | | |
|---|---|---|---|
| 7,584,546 | B2 | 9/2009 | Chabot et al. |
| 2014/0076996 | A1 | 3/2014 | Hayton et al. |
| 2018/0050355 | A1 | 2/2018 | Delsard |

FOREIGN PATENT DOCUMENTS

| | | | |
|---|---|---|---|
| CN | 101254589 | A | 9/2008 |
| CN | 104984841 | A | 10/2015 |
| CN | 106975188 | A | 7/2017 |
| CN | 107427851 | A | 12/2017 |
| CN | 109513149 | A | 3/2019 |
| DE | 1189854 | B | 3/1965 |
| DE | 19709098 | A1 | 11/1997 |
| DE | 20 2017 102 091 | U1 | 5/2017 |
| EP | 0 780 528 | A1 | 6/1997 |
| EP | 2 168 636 | A1 | 3/2010 |
| GB | 2 551 012 | B | 6/2021 |
| IT | VI20120326 | A1 | 6/2014 |
| JP | 2004358285 | A | 12/2004 |
| WO | 8404060 | A1 | 10/1984 |
| WO | 8501005 | A1 | 3/1985 |

LANCE, IN PARTICULAR EXTINGUISHING LANCE FOR FIGHTING FIRES

CROSS REFERENCE TO RELATED APPLICATIONS

This application is the National Stage of PCT/AT2020/060417 filed on Nov. 24, 2020, which claims priority under 35 U.S.C. § 119 of Austrian Application No. A 51022/2019 filed on Nov. 25, 2019, the disclosure of which is incorporated by reference. The international application under PCT article 21(2) was not published in English.

BACKGROUND OF THE INVENTION

1. Field of the Invention

The invention relates to a lance, in particular a piercing nozzle for firefighting, by means of which at least one additive can be dispensed together with the pressurized fluid.

2. Description of the Related Art

EP 2 168 636 A1 describes an equipment for introducing openings into a surface of an object and for supplying a fluid into a space through the previously created opening. This equipment comprises a pressure source for supplying a pressurized fluid, a lance with a nozzle arrangement and a conduit between the pressure source and the nozzle arrangement for supplying the pressurized fluid from the pressure source to the nozzle arrangement. The pressurized fluid flows out of the nozzle arrangement onto the surface essentially in the form of a jet, wherein an additive contained in a vessel may be entrained due to a pressure difference generated by the pressurized fluid in the nozzle arrangement. The nozzle arrangement has, as viewed in the flow direction, a first nozzle, a second nozzle, and an intermediate chamber between the first and the second nozzle. The pressurized fluid flows into the first nozzle and leaves the nozzle arrangement through the second nozzle. At least one inlet or multiple inlets opens or open into the intermediate chamber of the nozzle arrangement, wherein each inlet is connected to the conduit or a pipe, which is connected to a vessel containing the respective additive, or in the case of multiple inlets, connected to different vessels. On each inlet, an actuation means for a valve is provided to release or prevent the respective supply of the additive into the intermediate chamber. The actuation means are arranged directly on the nozzle arrangement on their respective inlets. The additive acting as an abrasive may be fed into the intermediate chamber via an inlet. If a second inlet is provided, an extinguishing foam or an extinguishing powder can be supplied to the nozzle arrangement by means of said second inlet, wherein this is also possible only after opening the valve and be sucked into the intermediate chamber of the nozzle arrangement by the pressurized fluid and be ejected out of the nozzle arrangement together with the fluid in the form of a fine mist.

IT VI20 120 326 A describes a lance with first and second handles arranged at a distance from one another, wherein the lance can be used to extinguish fires. By means of a first valve arrangement in the region of the first handle, the supply of a pressurized fluid can be enabled or prevented. Immediately adjoining the first handle, a control valve is provided in order to be able to feed the pressurized fluid either to a first pipe arrangement and/or to a second pipe arrangement extending in parallel with the former. The second handle is in turn mounted on the first pipe arrangement so as to pivotable with its handle end from a position closer to the operator to a position further away from the operator. Using the second handle, the fluid jet to be dispensed from the first pipe arrangement with its respective spray cone can be adjusted. In this regard, the fluid may be fed to an inner channel in order to dispense a more concentrated fluid jet from the first pipe arrangement. If the second handle and a control valve connected thereto is pivoted, the fluid is fed to an outer channel surrounding the inner channel on the outside, and a fluid jet with a relatively greater spray cone is dispensed.

A lance for extinguishing a fire in a space, which is closed by at least one closing element, has become known from DE 20 2017 102 091 U1. The lance comprises at least a first handle, which can be grasped by an operator and at least one first duct with a first inlet and a first outlet, which can be fluidically connected to a first feed line of a pressurized fluid. Moreover, the lance comprises a first controlling lever, which acts upon the at least one first duct to allow the operator to control the selective inflow of the pressurized fluid therethrough. At least one second duct with a second inlet and a second outlet is provided, which can be fluidically connected to a second feed line of an abrasive powder. A second controlling lever acts on the at least one second duct to allow an operator to control the selective inflow of the abrasive agent therethrough. A first nozzle has a pair of first inlet openings, each of which being fluidically connected to the first outlet and the second outlet. A Venturi-effect mixing means serves to mix the pressurized fluid and the abrasive powder upon selective activation of the inflow of the fluid and the powder through the second duct. A first outlet opening is provided for spraying a concentrated jet of the mixture of the pressurized fluid and the abrasive powder. The at least one first handle comprises the first and second controlling lever, wherein the controlling levers are arranged closely together to allow the operator to actuate the first controlling lever and the second controlling lever with the same hand used to grasp the at least one first handle. This lance has generally proven successful in the case of application, but it was often difficult to selectively operate the adjacently arranged controlling levers while wearing protective gloves.

DE 197 09 098 A1 describes a cleaning device for cleaning objects, which may be impinged upon by water, pressurized air, and chemical agents individually and/or a mixture thereof for the purpose of cleaning. For this purpose, a mixing and metering block is provided, which has feed lines for the individual cleaning components and an outlet for the discharge of the cleaning components in an individual or mixed state. Between the feed lines and the outlet, a single adjustable means is arranged, which is suitable for releasing all supplied components in a mixed, individual or metered manner, or to block at least one of these components.

SUMMARY OF THE INVENTION

The object of the present invention was to overcome the shortcomings of the prior art and to provide a lance which can be operated easily and safely by a user to allow them to optionally control the discharge of the additive with only one hand and to do this independently of handling the discharge of the fluid.

This object is achieved by a lance according to the claims.

The lance according to the invention is preferably used for extinguishing a fire during a firefighting operation, wherein first, an access opening through a solid body, such as a wall, a wall part, a car body part, a battery, or the like, must be created in order to be able to introduce or insert the pressurized fluid, in most cases water, for firefighting into the space located behind the solid body. For creating the at least one access opening, an additive, in particular a solid granulate material or another cutting agent, is added to or mixed in the pressurized fluid, and this mixture is applied by means of the lance to the site at which the access opening is to be created.

The lance may also be referred to as a piercing nozzle or thermal lance and comprises a lance body, a handle arrangement, which handle arrangement is arranged or formed on the lance body and comprises a first handle and a second handle, wherein the two handles are arranged at a distance from one another in the direction of the longitudinal extension of the lance body, and wherein every handle can each be grasped by a hand of the user for operating the lance, at least a first channel with a first channel inlet and a first channel outlet, wherein the first channel inlet can be connected to a feed line of the pressurized fluid, a first actuating means arrangement, which first actuating means arrangement is arranged in the region of the first handle of the handle arrangement, and a first actuating means is in direct operative connection to the first channel, wherein the first actuating means can be adjusted from a locked position to a flow position and vice versa and thus, the flow of the pressurized fluid through the first channel can be adjusted, at least one container with at least one removal opening, wherein the first additive can be accommodated in the first container, at least one second channel with a second channel inlet and a second channel outlet, wherein the second channel inlet is flow-connected to the at least one removal opening of the first container, a second actuating means arrangement, which second actuating means arrangement comprises at least a second actuating means, wherein the second actuating means can be adjusted from a closed position into a release position and vice versa and thus, the flow of the first additive through the second channel can be adjusted, a nozzle arrangement with a first nozzle body, wherein at least one first inlet opening, one second inlet opening, at least one outlet opening, and a mixing chamber are formed or arranged in the first nozzle body, and wherein the inlet openings open into the mixing chamber, and the mixing chamber is flow-connected to the at least one outlet opening, wherein the first channel outlet of the first channel is flow-connected to the at least one first inlet opening of the first nozzle body, and wherein the second channel outlet of the second channel is flow-connected to the second inlet opening of the first nozzle body, wherein it is further provided that the second actuating means arrangement comprises a control pin, which control pin is mounted on the lance body so as to be pivotable about its longitudinal axis, and that the second handle of the handle arrangement is rotationally coupled to the control pin of the second actuating means arrangement, in particular the second handle and the control pin are formed in one piece, and the second handle and the control pin are jointly pivotable about their longitudinal axis, that the at least one second actuating means of the second actuating means arrangement is arranged in the control pin, that at least one third channel with a third channel inlet and a third channel outlet is provided, and the third channel inlet is flow-connected to the outer environment, that the at least one first channel and the at least one third channel are arranged or formed in the lance body, that the third channel outlet of the third channel is directly flow-connected to the at least one first inlet opening of the first nozzle body, that the second actuating means of the second actuating means arrangement is in direct operative connection to the third channel, and the second actuating means arrangement is arranged in the region of the second handle, that the third channel is continuously open between its third channel inlet and its third channel outlet when the second actuating means is in the release position, and thus, a flow of ambient air through the third channel to the mixing chamber is made possible, and that the third channel is closed between its third channel inlet and its third channel outlet when the second actuating means is in the closed position, and thus, a flow of ambient air through the third channel to the mixing chamber is prevented, and in this operating mode, the first additive can be sucked into the mixing chamber from the first container via the second channel, and that the first channel comprises a first partial channel and a second partial channel in its longitudinal section between the second actuating means arrangement and the first channel outlet, and the first partial channel is arranged inside the second partial channel.

The advantage achieved thereby consists in that, with a simple adjustment movement of the second actuating means of the second actuating means arrangement, the flow and the intake of ambient air into the mixing chamber of the first nozzle body is controlled selectively and thus, in further consequence, the admixture of the first additive to the pressurized fluid is made possible or prevented. The flow and/or the intake of the first and/or through the second channel starting from the first container into the mixing chamber is determined by releasing or closing the separate and independent third channel in the region of the second actuating means arrangement. The first handle of the lance is held with one hand, and the first actuating means arrangement is operated with the same hand, as well. Thus, inadvertent operating errors are also avoided as the two actuating means arrangements are arranged at a distance from one another in the direction of the longitudinal extension. The second actuating means arrangement can be operated easily and safely using the other hand due to the distance from the first handle. Thus, a clear spatial separation of the two actuating means arrangements is achieved.

Moreover, it is also provided if the at least one first channel and the at least one third channel are arranged or formed in the lance body. Thus, a compact design of the lance body is achieved.

The second actuating means arrangement further comprises a control pin, which control pin is mounted on the lance body so as to be pivotable about its longitudinal axis. By providing a separate, essentially cylindrically-formed control pin, a variety of control positions of the individual actuating means are realized easily due to an easy rotation and/or pivot movement of the control pin and the actuating means located or arranged therein.

Moreover, the first channel comprises a first partial channel and a second partial channel in its longitudinal section between the second actuating means arrangement and the first channel outlet, and the first partial channel is arranged inside the second partial channel. By dividing the first channel following the second actuating means arrangement, an even more universal use of the lance and, associated therewith, the discharge of different types of jets is made possible. Thus, not only a solid jet but also a spray jet is made possible depending on the respective partial channel the pressurized fluid is passed through.

Finally, it is moreover provided that the second handle of the handle arrangement is rotationally coupled to the control pin of the second actuating means arrangement, in particular if the second handle and the control pin are formed as one piece. Thereby, an easy switching to the respectively desired operating mode of the lance is carried out without re-grasping and letting go of the second handle. This is carried out with only the same hand which also grasps the second handle.

A different embodiment is characterized in that the second channel is formed by a separate connecting line, and the connecting line is arranged so as to extend outside the lance body or inside the lance body. By providing a separate connecting line, which is arranged so as to extend outside the lance body, an easy replaceability of the first container and/or the first nozzle body can be made possible.

A further embodiment provides that the second actuating means of the second actuating means arrangement is formed by a through hole, in particular by at least one bore, passing through the control pin in the radial direction. Due to the combination of the control pin with the through hole and its coordinated arrangement, a robust and durable actuating and/or control device can be created.

Another embodiment is characterized in that the second actuating means arrangement moreover comprises a third actuating means, and the third actuating means is in direct operative connection to the second channel, wherein the third actuating means is adjustable out of a closed position into a release position and vice versa and thus, the flow of the first additive through the second channel can be adjusted directly. Thus, an additional control option for the second channel can be created in the region of the second actuating means arrangement. The third actuating means thus additionally interacts with the second actuating means. In this regard, an opposing control position of the second and third actuating means is always provided, namely such that when the second actuating means is in the closed position, the third actuating means is in the release position and vice versa.

A further preferred embodiment is characterized in that the third channel is closed when the second actuating means is in the closed position and the third actuating means is in its release position, and the second channel is continuously open, or that the third channel is continuously open when the second actuating means is in the release position and the third actuating means is in its closed position and the second channel is closed. Thus, a secure locking and/or closed position of the second channel when the second actuating means is in the release position can be achieved. Thus, an undesired removal of the first additive out of the first container could be securely prevented, even if the third channel is inadvertently shift of the third channel.

Moreover, it may be advantageous if the second actuating means and the third actuating means of the second actuating means arrangement are arranged at a distance from one another in the axial direction of the control pin and offset from one another when viewed in the circumferential direction. Depending on the circumferential offset, the extent of the adjustment movement and the associated switch of the operating mode of the lance can thus be achieved.

Another embodiment is characterized in that a second nozzle body is provided, which second nozzle body is arranged upstream of the first nozzle body in the flow direction of the pressurized fluid, and the first channel outlet of the first channel is arranged or formed in the second nozzle body. By providing a second nozzle body, an even more individual discharge option of the fluid out of the lance can be facilitated.

A further preferred embodiment is characterized in that the third channel is also arranged or formed in the second nozzle body. Thus, a channel formation of the third channel that is safe and protected from external environmental influences can be created.

Moreover, it may be advantageous if the first nozzle body of the nozzle arrangement is removably held on the lance body, in particular removably held on the second nozzle body. Thus, an easy exchange possibility of the first nozzle body is created. This way, for example a damaged or worn first nozzle body can be exchanged easily for a new first nozzle body, whereby the period of use of the entire lance can be increased significantly.

A further possible embodiment has the features that the first partial channel ends before the first channel outlet, as viewed in the axial direction, and opens into the second partial channel surrounding the first partial channel, and moreover at least an end section of the first partial channel is arranged with respect to the first channel outlet in an aligning orientation thereto. Thus, a straight and central discharge direction of the pressurized fluid out of the first partial channel, through the first channel outlet and further to the first nozzle body can be created.

A different alternative embodiment is characterized in that the second actuating means arrangement further comprises an actuating means group with at least one first actuator member and one second actuator member, which actuator members of the actuating means group are in direct operative connection to the first channel. By providing a separate actuating means group with multiple actuator members, the forwarding of the fluid in the respectively subsequent partial channel can be selectively preselected and optionally adjusted.

A further possible and possibly alternative embodiment has the features that the actuator members of the actuating means group are each formed by a breakthrough passing through the control pin in the radial direction, in particular are each formed by at least one bore. This also allows producing a compact adjusting device for controlling the fluid throughput that is less susceptible to errors.

A further embodiment provides that the actuator members of the actuating means group are arranged at a distance from one another in the axial direction and circumferentially offset, by an offset angle, from one another when viewed in the circumferential direction, and optionally only one of the actuator members at a time makes the flow of the pressurized fluid possible. Thus, a secure separation of the intake of the fluid into the respective partial channel can be ensured.

A further embodiment provides that the first actuator member of the actuating means group is in direct operative connection to the first partial channel, and the second actuator member of the actuating means group is in direct operative connection to the second partial channel. Thus, a clear assignment of the corresponding actuator member to the respectively associated partial channel is ensured.

A different alternative embodiment is characterized in that the third channel is closed when the second actuating means is in the closed position, and simultaneously, the flow connection between the first channel and the first partial channel is established by means of the at least one first actuator member, and moreover the flow connection between the first channel and the second partial channel is interrupted by means of the second actuator member. Due to the respective control position of the second actuating means with respect to the actuator members of the actuating means group, a solid jet of the fluid together with the first additive to be discharged can thus be achieved in this control position.

Moreover, it may be advantageous if the third channel is continuously open when the second actuating means is in the release position, and simultaneously, the flow connection between the first channel and the first partial channel is established by means of the at least one first actuator member, and moreover the flow connection between the first channel and the second partial channel is interrupted by means of the second actuator member. Due to this specified control position, the discharge of a solid jet of the fluid, but without the addition and/or admixture of the first additive, can be made possible. If a further container with a further additive is provided and if said further container is flow-connected to the third channel via the second actuating means, the respective additives stored in both the first container and the second container can be sucked in simultaneously. In this operating mode, the pressurized fluid out of the lance is also discharged in a solid jet.

Moreover, it may be advantageous if, when the first nozzle body is removed, the third channel is closed when the second actuating means is in the closed position, and simultaneously, the flow connection between the first channel and the first partial channel is interrupted by means of the at least one first actuator member, and moreover the flow connection between the first channel and the second partial channel is established by means of the second actuator member. By previously removing and/or taking off the first nozzle body and the correspondingly selected control position, the discharge of a spray jet out of the lance is thus made possible.

Moreover, it may be advantageous if a further container for a further additive to be accommodated therein is provided, and the further container is flow-connected to the second actuating means arrangement and further to the third channel via a fourth channel. Thus, when the second actuating means arrangement is in the operating position in which a solid jet with the admixed first additive is discharged, the possibility of not sucking in the ambient air directly into the third channel but rather indirectly via the second container is created. For sucking in the further additive, a separate container opening is to be provided to allow for an inflow and intake of ambient air into the container interior.

A different alternative embodiment is characterized in that at least one of the containers is removably held on the lance body. Thus, the container or the containers can be refilled or replaced easily and quickly during operation.

A further possible alternative embodiment is characterized in that a pivot arrangement is provided, by means of which pivot arrangement at least the first container is held so as to be pivotable on the lance body. Thus, the container or also the respective containers can be oriented relative to the lance body such that the intake point is always at the position closest to the bottom.

A further possible and possibly alternative embodiment has the features that at least one container opening is provided, which at least one container opening opens into a container interior of the container. This may allow the ambient air to flow into the container interior. Otherwise, a vacuum would build up in the interior due to the suction effect applied to the additive.

Finally, a further embodiment provides that the container interior is flow-connected to the outer environment via the container opening, and at least one filter element is arranged in the container opening. Thereby, depending on selection and design of the filter element, an inadvertent inflow of contaminations, dust particles, the previously dispensed additive and/or of humidity may be reduced or entirely prevented.

A possible alternative embodiment is characterized in that at least the further container is provided and the second actuating means arrangement further comprises the third actuating means, wherein, in a first operating position of the second actuating means arrangement, the third actuating means and the first actuator member of the actuating means group are each in their respective release position, and the second actuating means is in its closed position, and the third channel is closed, and wherein, in a second operating position of the second actuating means arrangement, the first actuator member of the actuating means group and the second actuating means are each in their respective release position, and the third actuating means is in its closed position, and the second channel is closed. With this design and arrangement of the actuating means and the actuator members of the second actuating means arrangement and the respectively selected operating position, a switching operation for admixing or adding the additive required in each case can be carried out in a quick and user friendly manner.

Moreover, it may be advantageous if the additive is selected from the group of solid granulate material, abrasive agent, extinguishing powder, extinguishing additive, foaming agent, dry ice, decontamination agent. Thereby, a high possibility of variation for a number of different purposes and operating conditions may be created.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
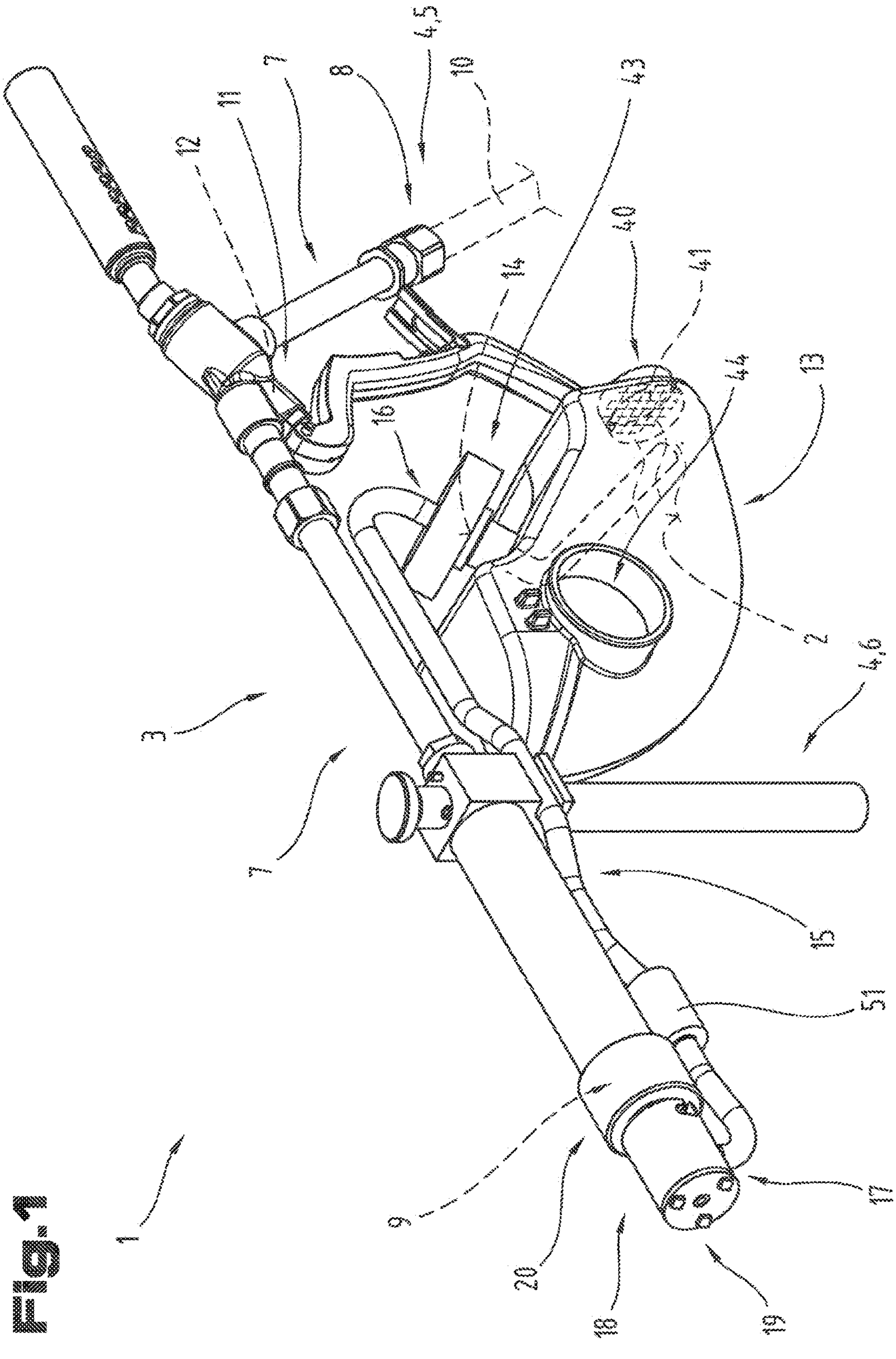
FIG. 1 shows a possible design of a lance in a diagrammatic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

In the following description and in the claims, the term direct or indirect are each used for how the actuating means or the actuating means group acts on the corresponding channel. In this regard, the term direct is to be understood to mean that the respective actuating means or one of the actuator members of the actuating means group itself physically acts on the associated channel and allows or prevents the flow and/or throughflow of the corresponding medium. The term indirect is to be construed such that the respective actuating means or one of the actuator members of the actuating means group is physically in operative connection to one of the channels and allows or closes the flow and/or the throughflow of the respective medium in the corresponding channel, wherein, however, depending on the operating position in another one of the channels, the flow and/or throughflow of a different medium is also allowed or prevented.

FIGS. 1 to 12 each show a lance 1 or its individual components, which may also be referred to as a piercing nozzle. Such lances 1 serve, for example during a firefighting operation, to fight fires in which the source of the fire is initially impossible to access as the space is closed and/or enclosed by walls. In order to gain access to the space containing the source of the fire, at least one access opening is to be created through the wall. Depending on the material or material composition of the wall, the creation or introduction of the access opening is associated with increased effort. Generally, a pressurized fluid, such as water, is used to fight fires or blazes. Additionally, admixing or adding at least one additive 2 to the pressurized fluid is known. The basic concept of the lance 1 is always the same, however, only different operating modes and/or additional embodiments are shown and described in the individual Figures.

If the lance 1 is designed as a universal lance, it may be used to dispense only the fluid and/or also a mixture, a solution, a suspension, or an emulsion of the at least one first additive 2 and the fluid together. This is carried out preferably at high to very high pressures above the ambient pressure.

The lance 1 comprises multiple component parts, wherein these are mentioned and described below. Thus, the lance 1 comprises a lance body 3, which may also be formed of multiple lance body parts. A handle arrangement 4 for operating and holding the lance 1 is arranged on the lance body 3. The handle arrangement 4 itself comprises a first handle 5 and a second handle 6, wherein the two handles 5, 6 are arranged at a distance from one another in the direction of the longitudinal extension of the lance body 3. Due to this often common spacing, a user of the lance 1 can grasp the first handle 5 with one hand and use the other hand to grasp the second handle 6 and thus, grasp and operate the lance 1 in a sufficiently secure manner. In order to be able to apply a high pressure force and/or pressing force of the lance 1 to that point of the wall in which the access opening is to be introduced, a shoulder support, which is not described in further detail, may be provided on the lance 1, in particular its lance body 3.

Moreover, at least one first channel 7 with a first channel inlet 8 and a first channel outlet 9 arranged at a distance from the former in the flow direction is provided, wherein the channel 7 allows establishing a flow connection between the first channel inlet 8 and the first channel outlet 9. The first channel inlet 8 can be connected, in particular coupled, to an adumbrated feed line 10. In order to control the supply of the fluid and, in further consequence, the flow of the fluid at least through the first channel 7, a first actuating means arrangement 11 is provided, which is arranged in the region of the first handle 5 of the handle arrangement 4. In order to make this control and the associated locked position or flow position of the first channel 7 possible, the first actuating means arrangement 11 comprises at least one first actuating means 12. In this regard, the first actuating means 12 can preferably be mechanically adjusted, manually from the locked position to the flow position and vice versa and is in direct operative connection to the first channel 7. Depending on the preselected position of the first actuating means 12, the flow of the pressurized fluid through the first channel 7 can be adjusted.

At least one first container 13 is provided for accommodating the first additive 2 and arranging it directly, immediately adjacent to the lance body 3. The container 13 is held on the lance body 3 so as to be removable as needed and has at least one removal opening 14.

In order to establish a line connection for transporting the first additive 2, at least one second channel 15 with a second channel inlet 16 and a second channel outlet 17 is provided. The second channel inlet 16 is flow-connected to the removal opening 14 of the first container 13.

A nozzle arrangement 18 with a first nozzle body 19 is arranged on the end of the lance 1 facing away from the first handle 5, which nozzle body 19 serves to discharge the fluid or the mixture of the fluid and the first additive 2. The nozzle arrangement 18 may also comprise a second nozzle body 20, wherein it is arranged upstream of the nozzle body 19 as viewed in the flow direction of the pressurized fluid. If the second nozzle body 20 is provided, the first channel outlet 9 of the first channel 7 may be arranged or formed in the second nozzle body 20. Moreover, it may be advantageous if the first nozzle body 19 of the nozzle arrangement 18 is removably held on the lance body 3, in particular removably held on the second nozzle body 20. In this case, the second channel 15 is to be formed in a separable or interruptible manner between its second channel inlet 16 and its second channel outlet 17.

The first nozzle body 19 has at least one first inlet opening 21, one second inlet opening 22, at least one outlet opening 23, and a mixing chamber 24. Following the inlet openings 21, 22, one inlet channel each is formed, inside which the respective medium is passed through. The inlet openings 21, 22 on their part open into the mixing chamber 24, wherein the mixing chamber 24 is flow-connected to the at least one outlet opening 23. The first inlet opening 21 together with the second inlet opening 22 defines a longitudinal axis 25, which extends parallel with respect to the longitudinal extension of the lance body 3. The longitudinal axis 25 also defines the general jet direction of the fluid or the mixture of the fluid and the additive 2 to be discharged. Preferably, the first inlet opening 21 has an orientation pointing in the direction of the longitudinal axis 25 and is thus oriented in the direction towards the lance body 3. The second inlet opening 22 has an angled arrangement relative thereto, wherein this may preferably be a normal orientation with respect to the longitudinal axis 25. It is also possible for an acute angle to be enclosed between the second inlet opening 22 and the longitudinal axis 25.

Moreover, the first channel outlet 9 of the first channel 7 is flow-connected to the at least one first inlet opening 21 of the first nozzle body 19. The second channel outlet 17 of the second channel 15 is flow-connected to the second inlet opening 22 of the first nozzle body 19. Thus, the fluid can be fed into the mixing chamber 24 via the first channel 7 and the first additive 2 can be fed into the mixing chamber 24 via the second channel 15.

In the region of the lance body 3, the lance 1 moreover comprises at least one third channel 26 having a third channel inlet 27 and a third channel outlet 28 arranged at a distance therefrom. The third channel inlet 27, in turn, is flow-connected to the outer environment. Thus, an inflow or intake of ambient air into the third channel 26 can be made possible. The third channel outlet 28, in turn, is also flow-connected to the first inlet opening 21 of the first nozzle body 19. This can take place as the first inlet opening 21 has a larger inlet cross-section. However, it would also be possible to divide the first inlet opening 21 into at least two partial openings. In that case, for example the first channel 7 could open into the first partial opening, and the third channel 26 could open into the second partial opening.

For the optional control of the passage through the third channel 26, a second actuating means arrangement 29 is thus provided, which comprises at least a second actuating means 30. The second actuating means 30 itself may be adjusted from a closed position into a release position and vice versa. Thus, the flow of the first additive 2 through the second channel 15 can be adjusted. The second actuating means 30 directly interacts with the third channel 26 but indirectly controls the intake or the flow of the first additive 2 through the second channel 15. Thus, a direct operative connection between the second actuating means 30 and the third channel 26 is provided. Moreover, it can be seen that the second actuating means arrangement 29 is arranged in the region of the second handle 6 of the lance 1.

If the second actuating means 30 is in its release position, the third channel 26 is continuously open, and "external air" can additionally be sucked into the mixing chamber 24 via the third channel 26 when the fluid flows through the first channel 7. The first additive 2 cannot be sucked out of the first container 13 into the mixing chamber 24 via the second channel 15 in this operating mode. However, if the second actuating means 30 is in its closed position, the third channel 26 is closed and ambient air cannot flow through. In this operating mode, the first additive 2 is sucked out of the first container 13 into the mixing chamber 24 via the second channel 15.

Figure 2:
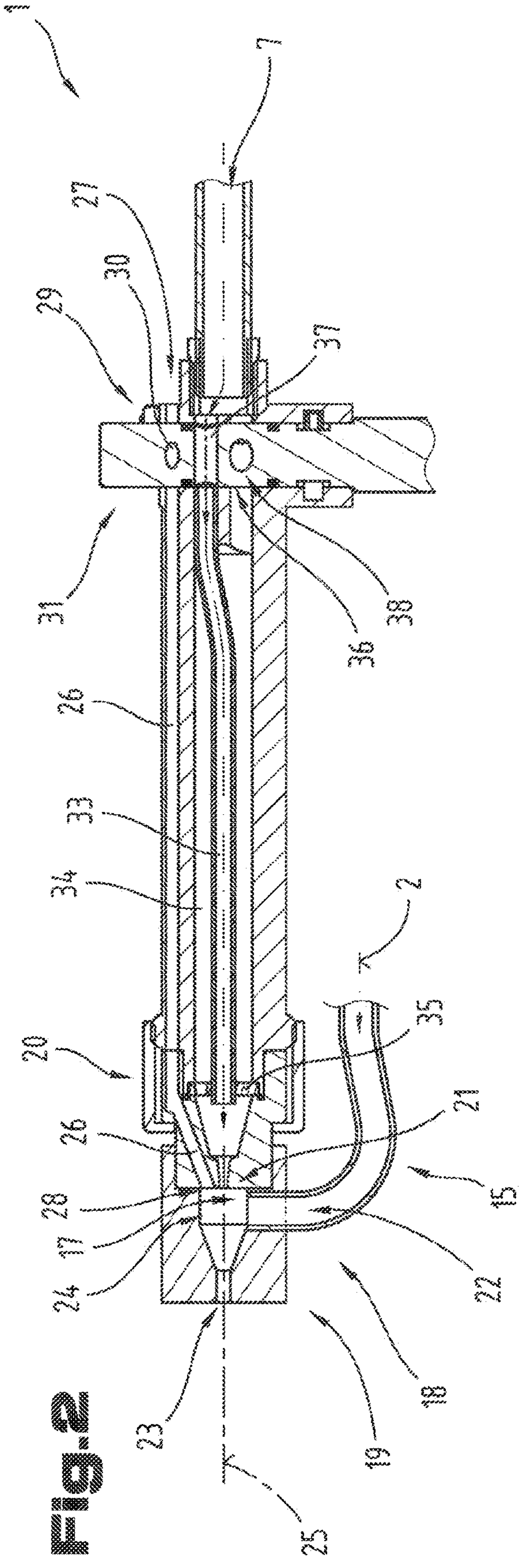
FIG. 2 shows the lance according to FIG. 1 in the operating mode solid jet with a first additive, in a longitudinal section.

Preferably, the at least one first channel 7 and the at least one third channel 26 are located in the lance body 3 and are thus arranged or formed in the lance body 3. The second channel 15 may preferably be formed by a separate connecting line. Moreover, the connecting line may be arranged so as to extend outside the lance body 3, as it is shown in FIGS. 1 and 2. However, it would also be possible to arrange or form the connecting line forming the second channel 15 inside the lance body 3. This is adumbrated in FIG. 3 as a possible variant.

If the second nozzle body 20 is provided or arranged or formed on the lance body, both the first channel 7 and the third channel 26 are arranged or formed in the second nozzle body 20.

The second actuating means arrangement 29 situated in the region of the second handle 6 may comprise a control pin 31 or be formed by one. The control pin 31 is further mounted on the lance body 3 so as to be pivotable or rotatable about its longitudinal axis. Preferably, the second handle 6 of the handle arrangement 4 is rotationally coupled to the control pin 31 of the second actuating means arrangement 29. An integral design of the second handle 6 and the control pin 31 is also possible. The control pin 31 is rotatably accommodated in a hollow-cylindrical hole, in particular a bore, which is formed or arranged in the lance body 3. When viewed in the flow direction, the channels 7, 15, 26, and 47 open into the hollow-cylindrical hole and continue downstream.

The control pin 31 generally has a cylindrical basic shape, possibly with different diameters. In this exemplary embodiment, the previously described second actuating means 30 may be formed by a through hole 32 passing through the control pin 31 in the radial direction, or a through hole 32 passing through in the normal direction with respect to the longitudinal axis of the control pin 31. Preferably, the through hole 32 is formed by at least one bore, which passes through the control pin 31 fully.

For forming different forms of jets of the pressurized fluid, it may also be provided in this lance 1 that the first channel 7 comprises or is divided into a first partial channel 33 and at least a second partial channel 34 in its longitudinal section between the second actuating means arrangement 29 and the first channel outlet 9. Regarding the form of jets, this lance 1 allows the distinction between a so-called solid jet and a spray jet. The solid jet constitutes a rather circumferentially concentrated jet pattern of the fluid, whereas the spray jet constitutes a spatially much greater jet pattern. The cone angle of the solid jet is substantially smaller than that of the spray jet.

Here, the first partial channel 33 is that channel which is arranged inside the second partial channel 34 and through which the fluid is conducted preferably centrally through the lance body 3 to form the solid jet. The second partial channel 34 surrounds the first partial channel 33. The first partial channel 33 ends before the first channel outlet 9 when viewed in the axial direction and opens into the second partial channel 34 surrounding the first partial channel 33. In its end section, the second partial channel 34 has a conically tapering cross-sectional shape. In order to form the spray jet, a deflection body 35 may be provided in the end region or in the end section of the second partial channel 34. In this exemplary embodiment, the first partial channel 33 passes through the deflection body 35, preferably centrally, and opens into the conically tapering second partial channel 34. Thus, the at least one end section of the first partial channel 33 is arranged in an aligning orientation with respect to the first channel outlet 9. In the deflection body 35, at least one or preferably multiple flow openings for the fluid to be conducted may be provided.

For the optional supply of the two partial channels 33, 34, the second actuating means arrangement 29 may further comprise an actuating means group 36 with at least a first actuator member 37 and a second actuator member 38. As described above, the second actuating means arrangement 29 is located in the region of the second handle 6 as well as preferably also in the control pin 31. Thus, the actuating means group 36 is also arranged or formed in the control pin 31, and its control positions can be adjusted by means of a rotation or pivot movement of the control pin 31 about its longitudinal axis. Moreover, the actuator members 37, 38 of the actuating means group 36 are in direct operative connection with the first channel 7 before it is split into the partial channels 33, 34.

The actuator members 37, 38 of the actuating means group 36 may each be formed by a breakthrough 39 passing through the control pin 31 in the radial direction, in particular by at least one bore. In order to achieve a perfect separation and supply of the two partial channels 33, 34 directly following the control pin 31 and its actuator members 37, 38, the actuator members 37, 38 are arranged at a distance from one another in the axial direction and circumferentially offset, by an offset angle, from one another when viewed in the circumferential direction. Due to the circumferential offset of the actuator members 37, 38 relative to one another, optionally only one of the actuator members 37, 38 may allow the flow of the pressurized fluid depending on the control position of the control pin 31. In this exemplary embodiment, the first actuator member 37 is in direct operative connection to the first partial channel 33, whereas the second actuator member 38 is in direct operative connection to the second partial channel 34.

The adjustment movements to be carried out circumferentially and/or in the circumferential direction about the longitudinal axis of the control pin 31 can be limited by means of stop means with cooperating stop limiting elements. As this possibility is sufficiently known, it is not elucidated in further detail.

It has proven advantageous if a mechanical safety lock is provided in connection and/or cooperation with the second actuating means arrangement 29 in case the first container 13 is present on the lance body 3. Thus, the mechanical safety lock may be formed, for example, such that the second channel 15 interacts with a stop element 50 situated on the control pin 31—see FIGS. 4 and 10—and the operating position spray jet with the addition of the first additive 2 is not possible. The second channel 15 leading from the first container 13 to the first nozzle body 19, which is formed, for example, as a pipe, forms a stop for the stop element 50 and prevents the switching or adjustment of the control pin 31 into the operating position shown in FIG. 8.

In this exemplary embodiment, a protection mechanism for an operating error is provided. This way, the fluid can be prevented from returning back into the first container 13 via the second channel 15.

Figure 8:
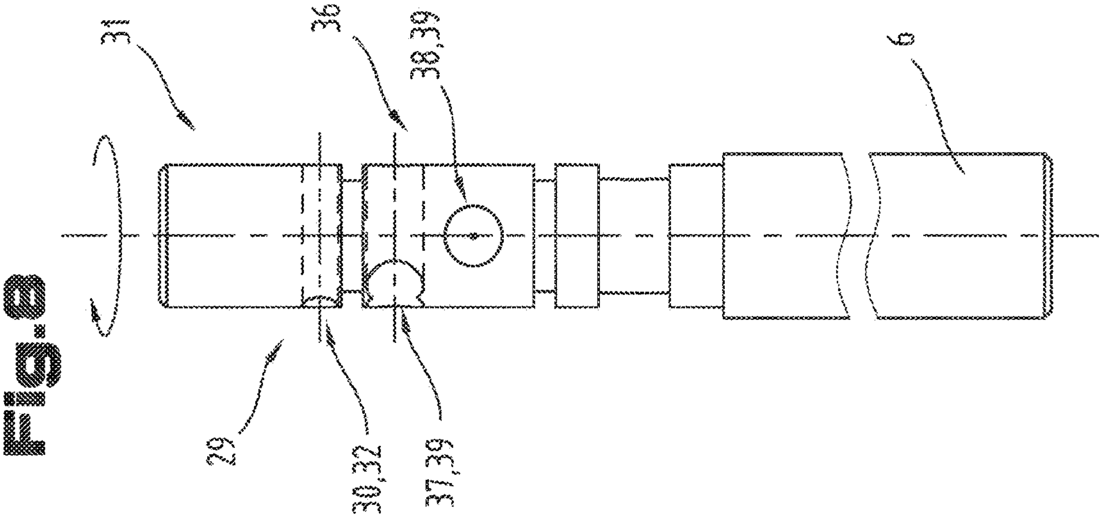
FIG. 8 shows the control pin of the lance according to its operating position in FIG. 4, in a view in the direction of the flow direction.
Figure 7:
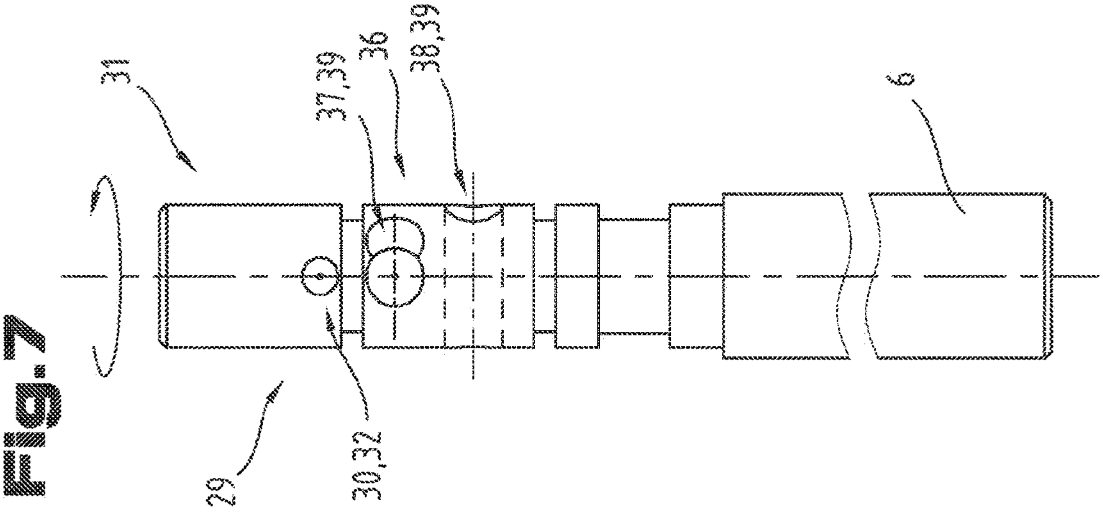
FIG. 7 shows the control pin of the lance according to its operating position in FIG. 3, in a view in the direction of the flow direction.
Figure 6:
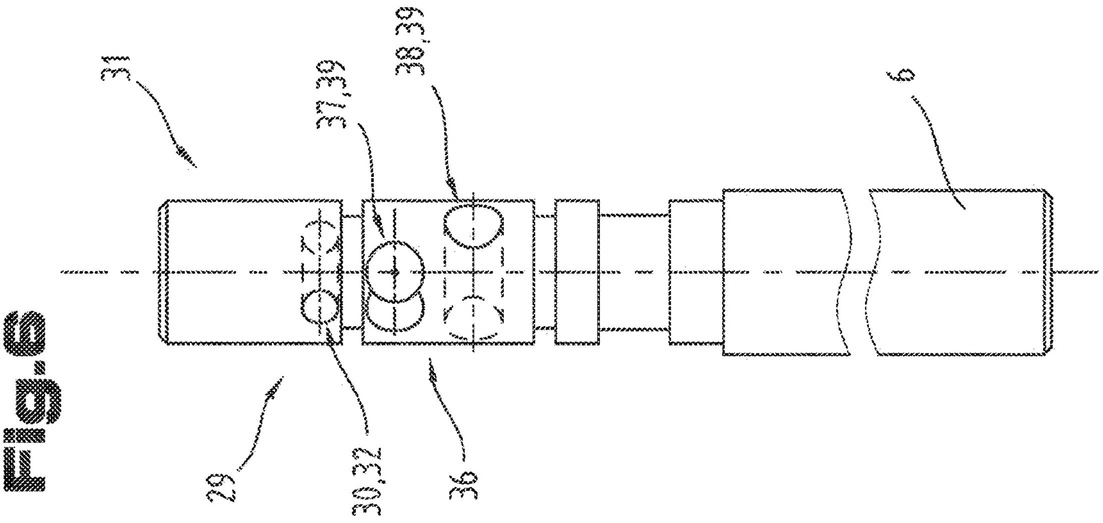
FIG. 6 shows the control pin of the lance according to its operating position in FIG. 2, in a view in the direction of the flow direction.

FIGS. 6 to 8 show a possible embodiment of the control pin 31 solely with its second actuating means arrangement 29. The viewing direction onto the control pin 31 is selected such that it is directed starting from the user of the lance 1 in the direction of the longitudinal extension towards the nozzle arrangement 18.

FIG. 6 shows that control position of the second actuating means arrangement 29 in which the joint discharge of the fluid in a solid jet and of the first additive 2 takes place by means of the lance 1. This operating position is also seen in FIG. 2.

The second actuating means 30 is in tis closed position, whereby the third channel 26 is closed and no ambient air can flow through the third channel 26. Simultaneously, the at least one first actuator member 37 is in its release position and established and/or forms the flow connection between the first channel 7 and the first partial channel 33. Moreover, the flow connection between the first channel 7 and the second partial channel 34 is interrupted by means of the second actuator member 38.

Figure 3:
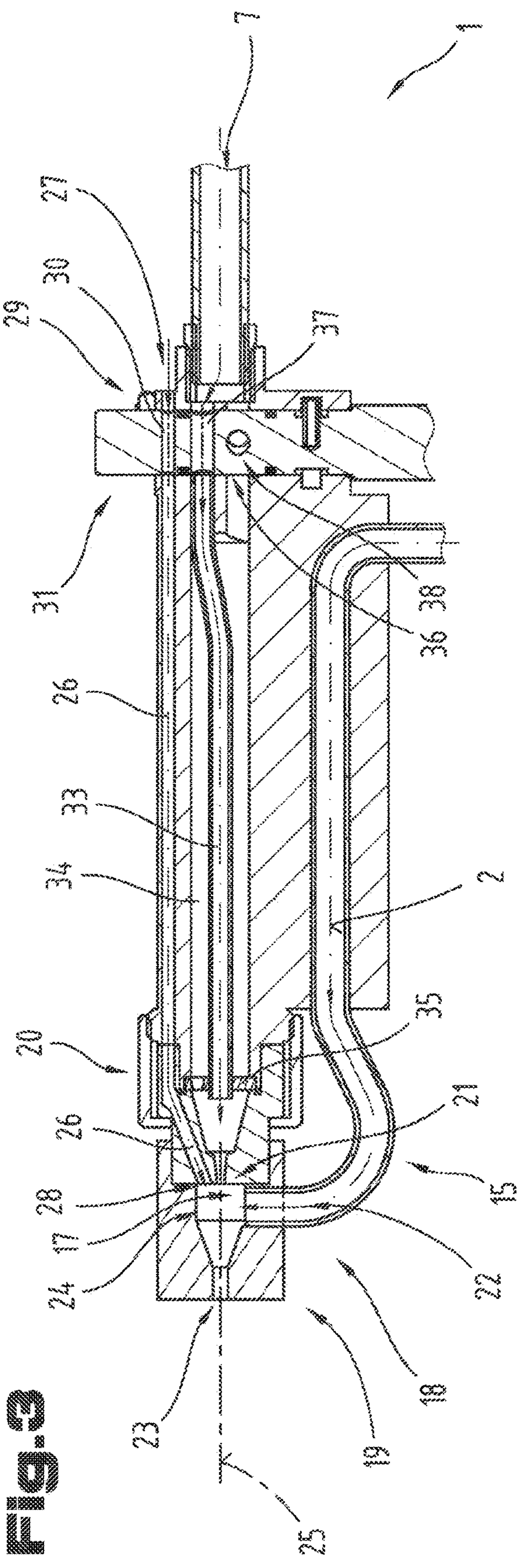
FIG. 3 shows the lance according to FIG. 1 in the operating mode solid jet without a first additive, in a longitudinal section.

FIG. 7 shows that control position of the second actuating means arrangement 29 in which the discharge of the fluid in a solid jet, but without the admixture of the first additive 2 takes place by means of the lance 1. This operating position is also seen in FIG. 3.

For this purpose, the second actuating means 30 is in its release position, whereby the third channel 26 is continuously open. Simultaneously, the flow connection between the first channel 7 and the first partial channel 33 is formed by means of the at least one first actuator member 37. Moreover, the flow connection between the first channel 7 and the second partial channel 34 is interrupted by means of the second actuator member 38. In FIG. 6, the pivot direction of the control pin 31 is adumbrated starting from the control position with a direction of the arrow above the control pin 31. Here, this is to be carried out counterclockwise.

The discharge of different forms of jets by means of the lance 1 may be carried out with both nozzle bodies 19, 20. However, it is also possible to remove the first nozzle body 19 from the second nozzle body 20 and to possibly also interrupt the line connection of the second channel 15.

Figure 4:
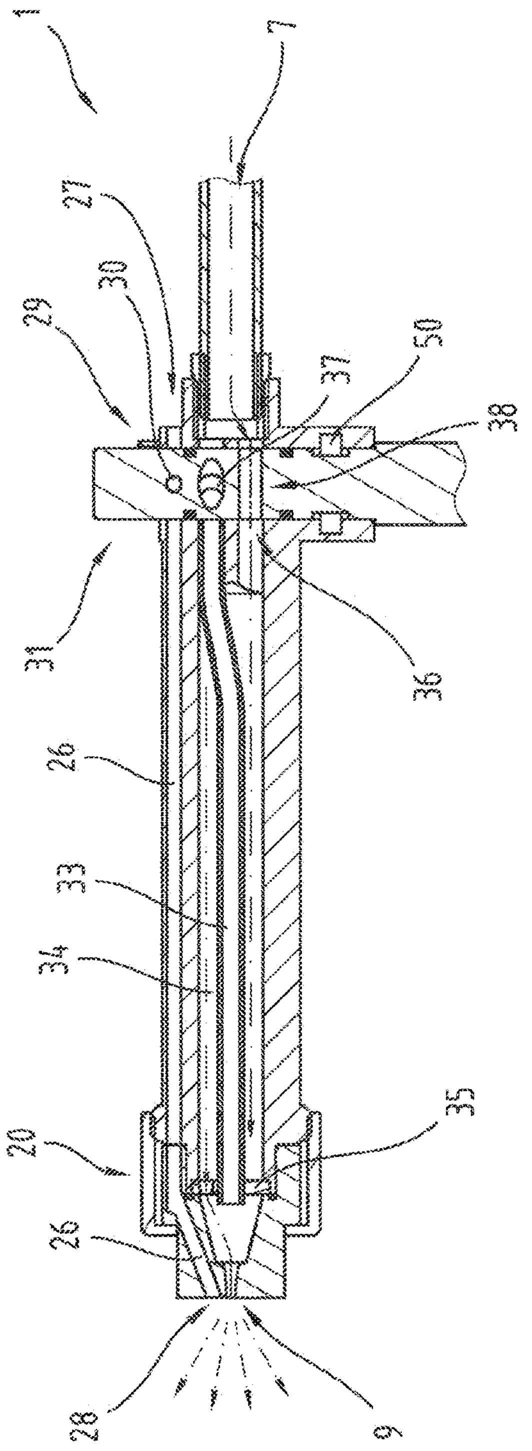
FIG. 4 shows the lance according to FIG. 1 in the operating mode spray jet with the first nozzle body being removed, in a longitudinal section.
Figure 5:
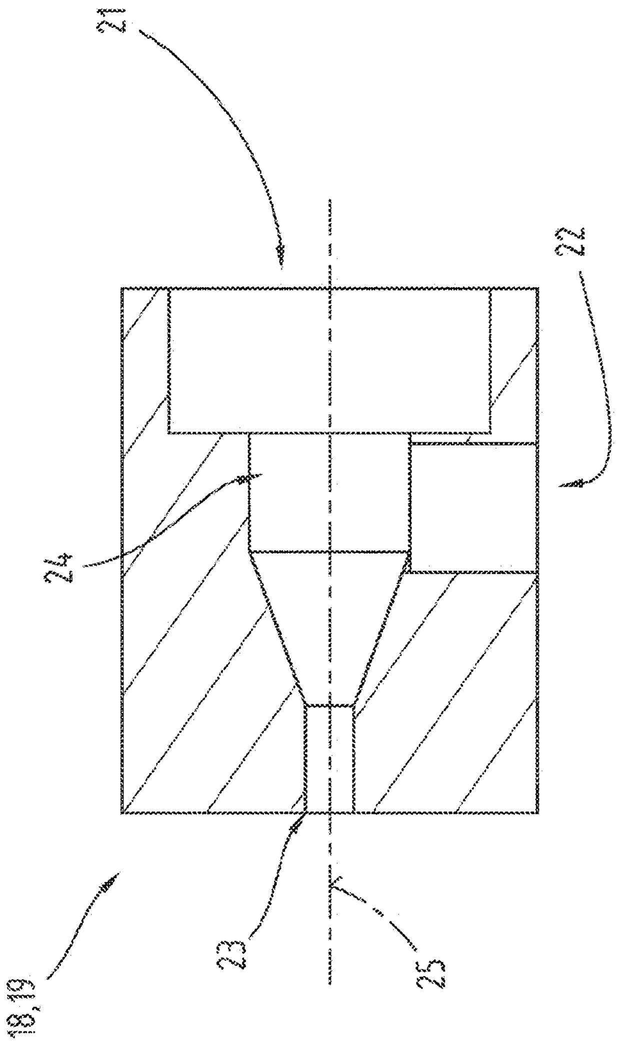
FIG. 5 shows the first nozzle body of the lance, in an axial section and an enlarged view.

FIG. 8 shows a control position of the second actuating means arrangement 29 in which only the discharge of the previously described spray jet is possible. This operating position is also seen in FIG. 4.

For this purpose, the first nozzle body 19 described above is to be taken off and/or removed from the lance body 3, in particular from the second nozzle body 20. The mutual holding may take place, for example, by means of a bayonet lock or a thread arrangement. Moreover, the line connection of the second channel 15 is possibly to be interrupted. For the sake of clarity, this is not further described and depicted. Due to the removal of the first nozzle body 19 and the associated interruption of the line of the second channel 15, it is also impossible to remove the first additive 2 from the first container 13. Therefore, the control position of the second actuating means 30 with respect to the third channel 26 is also not of significance and thus irrelevant.

In this control position, the second actuating means 30 is, for example, in its closed position, whereby the third channel 26 is closed. Simultaneously, the flow connection between the first channel 7 and the first partial channel 33 is interrupted by means of the at least one first actuator member 37. For this purpose, the flow connection between the first channel 7 and the second partial channel 34 of the first channel 7 is formed by means of the second actuator member 38. The better distribution of the fluid for creating the spray jet can be achieved by means of the deflection body 35 in the end section of the second partial channel 34.

As an additive 2, at least one solid granulate material is used for separation or cutting purposes, which material may also be referred to as a so-called abrasive agent and be made up of a variety of materials. These materials may be, for example, iron, steel, quartz, carbides, etc. However, the additive 2 may also be made up of dry ice or a foaming agent, an extinguishing powder, an extinguishing additive, or also by a decontamination agent.

Preferably, at least the first container 13 may be removably held on the lance body 3. For this purpose, appropriate coupling means are to be provided. The arrangement and holding of the first container 13 on the lance body 3 or the connection to the second channel 15 may also be formed such that a pivot movement of the first container 13 relative to the lance body 3 or the second channel 15 is possible. For this purpose, the coupling means, which is not described in further detail, may also comprise a pivot arrangement 43. By means of the pivot arrangement 43, it becomes possible to pivot the first container 13 with the first additive 2 contained therein such that, due to gravity, said additive 2 is always at that location at which the removal location is located inside the first container 13. Inside the first container 13, a pipe in a fixed position is provided starting from the coupling means of the pivot arrangement 43. Thus, a user may hold the lance body 3 in a position intended for the respective operation, for example not holding the handles 5, 6 in the vertical direction pointed at the ground, but rather in a horizontal orientation. The position of the first container 13 can now be readjusted such that the removal location assumes the position closest to the bottom again. The removal opening 14 out of the first container 13 is also situated in the region of the coupling means with the second channel 15.

In order to be able to fill or refill the first additive 2 into the first container 13, a fill opening 44 may be provided—see FIG. 1.

In order to allow an inflow of ambient air during the removal of the first additive 2 out of the container interior of the first container 13, at least one container opening 40 may be provided. The at least one container opening 40 opens into the container interior of the first container 13 and passes through the container wall. Thus, the container interior is flow-connected to the outer environment via the container opening 40. For reducing or preventing the inflow or intake of dirt particles, the inserted and dispensed additive 2, or humidity, for example, it may be advantageous to arrange at least one filter element 41 in the at least one container opening 40.

As described above, the supply of the first additive 2 via the second channel 15 is controlled indirectly by releasing or closing the third channel 26 and the at least one second actuating means 30, which is in direct operative connection to the third channel 26.

Figure 9:
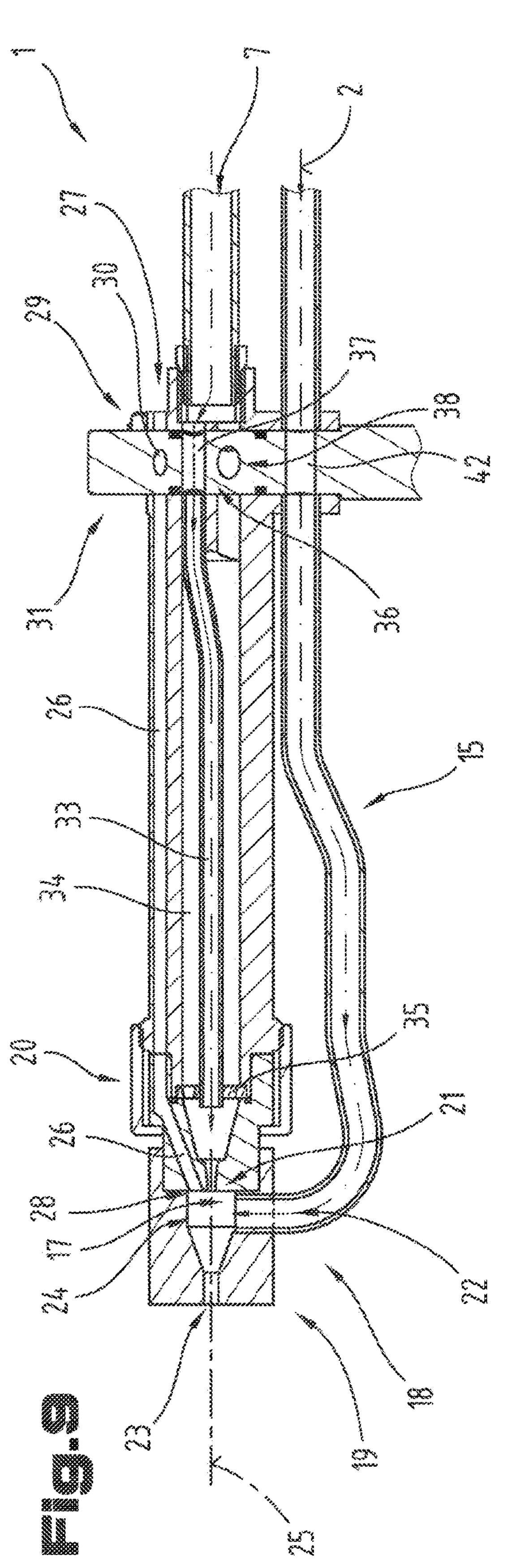
FIG. 9 shows a possible embodiment variant of the lance, in which the second line for the first additive is controlled by a third actuating means, as well, in a longitudinal section.

However, it would additionally also be possible, as it is shown in FIG. 9, to provide a third actuating means 42 in the region of the second actuating means arrangement 29, which third actuating means 42 is in direct operative connection to the second channel 15. The third actuating means 42 itself is adjustable from a closed position into a release position and vice versa. Thus, the flow of the first additive 2 through the second channel 15 can be directly adjusted. When the second actuating means 30 is in the closed position, the third channel 26 is closed, wherein simultaneously, the third actuating means 42 is in its release position and thus, the second channel 15 is continuously open. In this operating position or control position, the first actuator member 37 is also in its release position and a flow connection is established between the first channel 7 and the following first partial channel 33. Simultaneously, however, the flow connection between the first channel 7 and the subsequent second partial channel 34 is interrupted by means of the second actuator member 38.

In the further possible control position of the second actuating means arrangement 29, the second actuating means 30 may be in its release position, wherein the third channel 26 is continuously open, whereas the third actuating means 42 is in its closed position and thus the second channel 15 is closed. In this control position, a removal of the first additive 2 out of the first container 13 is safely prevented. The second actuating means 30 and the third actuating means 42 of the second actuating means arrangement 29 are arranged at a distance from one another in the axial direction and offset from one another when viewed in the circumferential direction.

The actuator members 37, 38 of the actuating means group 36 may be arranged in the axial direction between the second actuating means 30 and the third actuating means 42.

The third actuating means 42 of the second actuating means arrangement 29 may also be formed, as already described above, by at least one through hole passing through the control pin 31 in the transverse direction with respect to its longitudinal extension, in particular by at least one bore.

Figure 10:
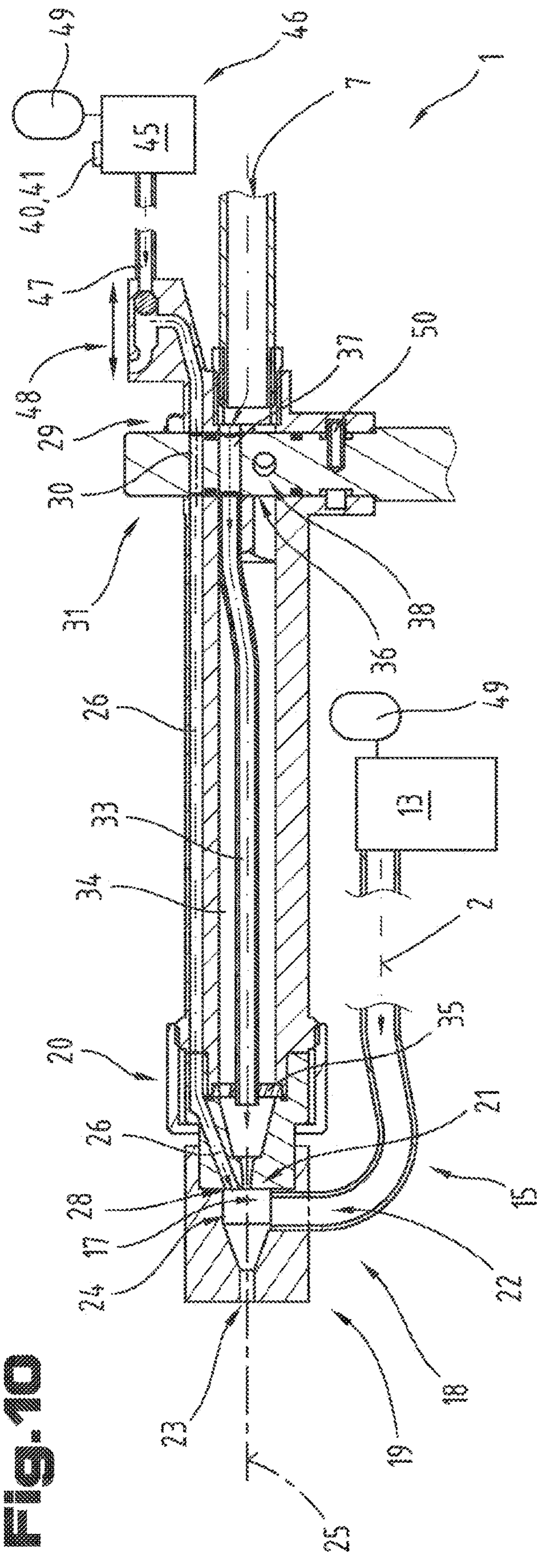
FIG. 10 shows an alternative embodiment variant of the lance, in which a further additive may be added to the fluid from a further container via the third channel, in a longitudinal section.

FIG. 10 further shows that additionally and alternatively to the first additive 2, which is to be removed from and/or sucked out of the first container 13, a further additive 45 can optionally be added or admixed to the fluid conducted through the first channel 7. For accommodating or storing the further additive 45, a further container 46 is provided. The further additive 45 may be selected from the group of solid granulate material, abrasive agent, extinguishing powder, extinguishing additive, foaming agent, dry ice, decontamination agent. However, in most cases, solid granulate material or abrasive agents are no longer used, although this is not necessarily precluded.

The embodiment as well as the control position of the control pin 31 with its actuating means 30 and actuator members 37, 38 formed or accommodated therein may take place such as it is shown in FIG. 7.

The further container 46 is flow-connected, via a fourth channel 47, first to the second actuating means arrangement 29 and the second actuating means 30. The second actuating means 30 is in its release position and thus establishes the continuous flow connection starting from the further container 46 via the third channel 26 to the third channel outlet 28. In order to prevent an interruption of the supply of the further additive 45 out of the further container 46, for example a switching member 48 may be provided in the fourth channel 47 by means of which the supply and the intake of ambient air into the third channel 26 or the intake of the further additive 45 out of the further container 46 into the third channel 26 may optionally be selectively controlled. If the switching member 48 is in that operating position in which the intake of ambient air into the third channel 26 is enabled, and if the second actuating means 30 and the actuator members 37, 38 are also in the operating position previously described in FIG. 7, the fluid is dispensed from the lance 1 in a solid jet but without the first additive 2. In the further possible operating position of the switching member 48 and when the position of the second actuating means 30 and the actuator members 37, 38 remains unchanged, both an intake of the first additive 2 via the second channel 15 and an intake of the second additive 45 via the third channel 26, into the mixing chamber 24 take place.

The further container 46 preferably also comprises the at least one container opening 40 already described above for sucking in ambient air into the container opening. Moreover, the filter element 41 may also, again, be provided for the container opening 40.

Moreover, FIG. 10 also shows that at least the first container 13 and/or also the further container 46 can be line-connected to at least one additional pressure source 49. Thus, every one of the containers 13, 46 can each be line-connected to its own pressure source 49. However, a shared pressure source 49 could also be provided for the containers 13, 46. The at least one pressure source 49 may be formed, for example, by a cartridge or a gas bottle with a pressurized propellant gas, which has flame retardant properties and/or a flame retardant effect. This may be, for example, $CO_2$, which is accommodated in a storage container which is not described in further detail. For the sake of clarity, the more detailed designation and description of a variety of line connections has been dispensed with.

Figure 11:
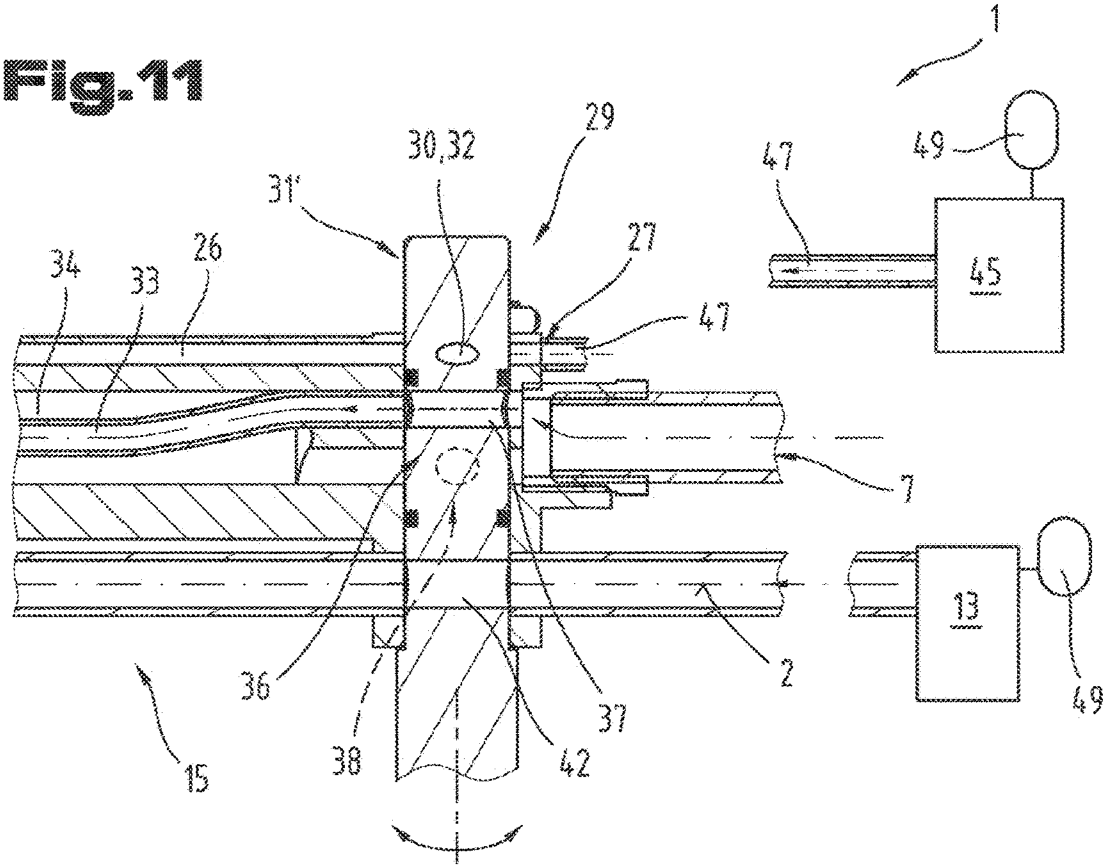
FIG. 11 shows a further possible embodiment of the second actuating means arrangement for the optional discharge of the first additive from the first container or of the second additive from the second container, in its first operating position, in a longitudinal section.
Figure 12:
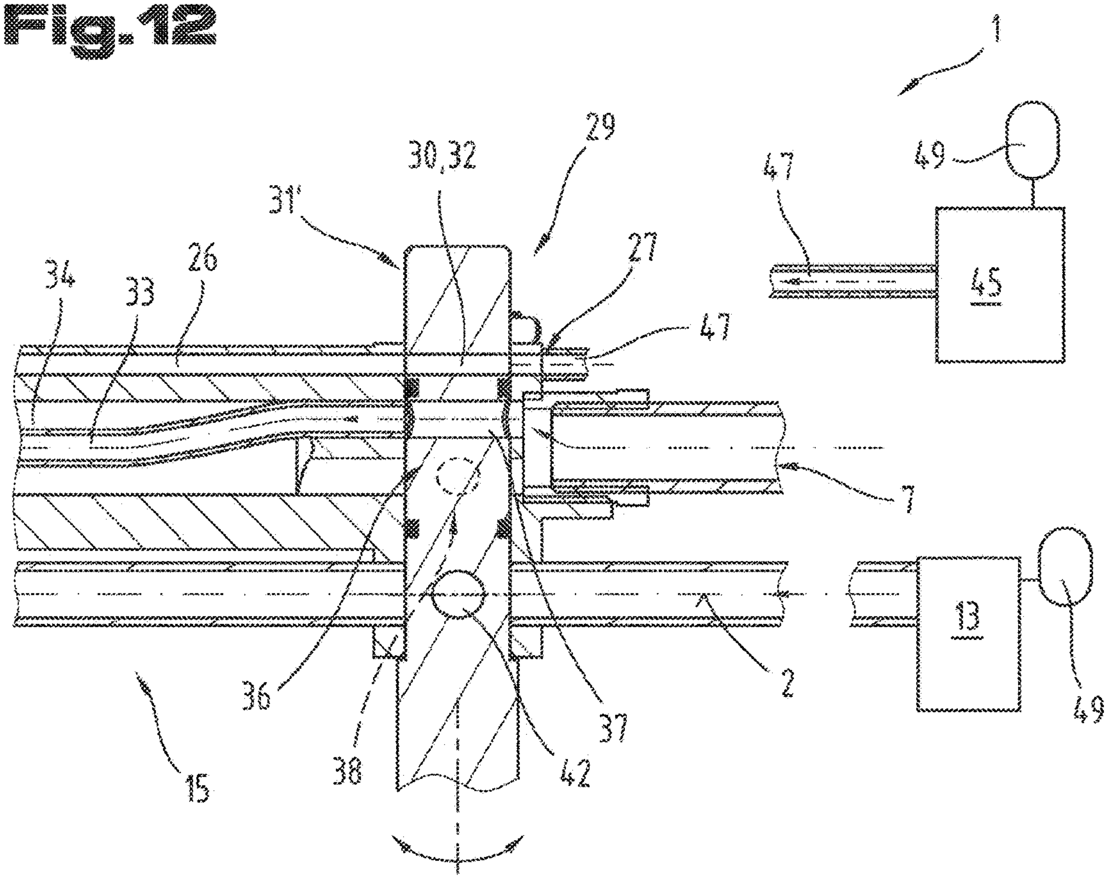
FIG. 12 shows the second actuating means arrangement according to FIG. 11, but in its second operating position, in the longitudinal section.

FIGS. 11 and 12 show a further and possibly independent embodiment of a lance 1, in particular its second actuating means arrangement, wherein again, equal reference numbers and/or component designations are used for equal parts as in FIGS. 1 to 10 above. In order to avoid unnecessary repetitions, it is pointed to/reference is made to the detailed description in FIGS. 1 to 10 above.

The embodiment of the lance body 3 with the channels 7, 15 and 26 as well as the partial channels 33 and 34 of the first channel 7 may take place analogously to what has already been described in detail above.

In this exemplary embodiment, it is provided that the lance 1 comprises at least the two containers 13 and 46 described above, wherein these may be arranged directly on the lance body 3 or optionally may also be arranged separately therefrom. In each of the containers 13, 46, a selected one of the previously described additives 2, 45 is accommodated. The further container 46 may be flow-connected to the second actuating means arrangement 29 and the second actuating means 30 situated there via the fourth channel 47, as it has already been described in FIG. 10. The provision of the switching member 48 may potentially be dispensed with.

The second channel 15 for the first additive 2 is in direct operative connection to the third actuating means 42 of the second actuating means arrangement 29, as it is shown and described in FIG. 9. Preferably, the control pin 31 is also provided here again, wherein, however, the arrangement and design of the actuating means 30, 42 and of the actuator members 37 and 38 of the actuating means group 36 is to be adapted to the operating positions required in each case. This may be realized, for example, by demounting and/or removing the existing control pin 31, possibly together with the second handle 6, from the lance body 3 and replacing it with an adapted new further control pin 31'.

Thus, FIG. 11 shows that operating position or control position of the actuating means 30, 42 and of the actuator members 37 and 38 of the actuating means group 36, which are formed or arranged on the control pin 31, in which the first actuator member 37 of the actuating means group 36 releases the flow of the pressurized fluid from the first channel 7 into the first partial channel 33 following the former in the direction of flow. This constitutes the release position for the flow of the fluid. The second actuator member 38 of the actuating means group 36 is in its closed position and/or locked position. The formation or arrangement of the second actuator member 38 may possibly be dispensed with altogether.

Moreover, the second actuating means 30, in particular the through hole 32 forming the actuating means 30, is in its closed position and/or locked position. However, the third actuating means 42 for the second channel 15 is in its release position. In this operating position, the third channel 26 is to be considered closed, the fluid flows from the second channel 7 via the opened first actuator member 37 into the first partial channel 33 to the first channel outlet 9, further into the mixing chamber 24 of the first nozzle body 19 and is then discharged out of the lance 1 at the outlet opening 23. As the third actuating means 42 for the second channel 15 is in its release position, the first additive 2 can be sucked into the mixing chamber 24 and added to the fluid before being discharged from the first nozzle body 19. This applies also because the second actuating means 30 is in its closed position and/or locked position.

FIG. 12 shows that operating position or control position of the actuating means 30, 42 and of the actuator members 37 and 38 of the actuating means group 36 in which admixing or adding the first additive 2 is not provided. However, only the further or second additive 45 is to get into the mixing chamber 24 starting from the second or further container 46, possibly the fourth channel 47, via the third channel 26, where it is admixed in the flowing fluid.

For this purpose, the third actuating means 42 for the second channel 15 is in its closed position and/or locked position. Thus, the supply or the intake of the first additive 2 out of the first container 13 is prevented. The second actuating means 30, in particular the through hole 32 forming the actuating means 30, is in its release position. Thus, a continuous flow connection is formed starting from the further container 46, possibly the fourth channel 47, to the second actuating means 30, the third channel 26 up to the third channel outlet 28. The first actuator member 37 of the actuating means group 36 is in its release position and conducts the fluid from the first channel 7 into the subsequent first partial channel 33. The second actuator member 38 of the actuating means group 36 is in its closed position and/or locked position.

With this embodiment of the second actuating means arrangement 29, it is possible to emit a solid stream of the fluid in both operating positions while being able to optionally dispense different additives 2, 45. In the first operating position according to FIG. 11, only or exclusively the first additive 2 is added to the fluid via the second channel 15. If, however, the second operating position is selected according to FIG. 12, only or exclusively the further additive 45 is added to the fluid via the third channel 26.

Thus, the user of the lance 1 is provided an easy switching option during use. Thus, in the first operating position, a cutting or separating operation in the solid body, which often constitutes an obstacle for the extinguishing or cooling operation, can be carried out to create the access opening. If this has taken place, it is possible to quickly change or switch to adding or admixing the further additive 45, in particular by using a pivot movement of the second handle 6 together with the control pin 31' about its longitudinal axis. Depending on the container 13, 46 from which the removal takes place at that moment, the corresponding additive 45, 2 can be refilled in the container 46, 13 that is not currently used, or the container can be replaced altogether.

Moreover, it may also be provided that not only a solid jet can be dispensed by the lance 1 but possibly also a spray jet, as it has already been described above. For this, the first nozzle body 19 may remain arranged on the lance body 3 or the second nozzle body 20. However, its demounting and/or removal is preferably provided.

When the second actuator member 38 is arranged and formed accordingly, the forwarding of the fluid from the first channel 7 into its second partial channel 34 can be controlled optionally. For this purpose, it would be possible to provide a locking or separating member 51—see FIG. 1—in the longitudinal extension of the second channel 15. Thus, the flow of the first additive 2 through the second channel 15 can be interrupted or locked, and/or the removal of the first nozzle body 19 with a partial section of the second channel 15 up to the locking or separating member 51 is possible. In the corresponding operating position, the admixture or addition of the second additive 45 via the third channel 26 after releasing the second actuating means 30 is possible, wherein, however, the pressurized fluid is fed into the second partial channel 34 via the second actuating means 38. The fluid subsequently flows into the mixing chamber 24 where it is united with the second or further additive 45 and dispensed from the lance 1 along with it.

Finally, it should be pointed out that the lance 1 shown in FIGS. 1 to 12 and its components are only to be considered possible exemplary embodiments, wherein arrangements of the channels 7, 15 and 26 deviating therefrom are possible, as well. For example, the second channel 15 could extend and/or be arranged to the side of or above the lance body 3. The same applies to the partial channels 33 and 34 of the first channel 7 following the second actuating means arrangement 29. Thus, the first and second partial channel 33 and 34 may also be arranged so as to extend next to one another. It would also be possible to arrange or form the second channel 15 inside the lance body 3.

Preferably, at least the first container 13 is removably held on the lance body 3. However, it would also be possible to hold the first container 13 separate from the lance 1, in particular on the operator of the lance 1. This way, the first container 13 could be carried, for example, on the back and/or on a belt of the operator. A further possibility may consist in carrying the first container 13 only up to the operating site and to place it on the ground there, separately from the lance 1. The second channel 15 forms the connecting line between the first container 13 and the first nozzle body 19.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

Although only a few embodiments of the present invention have been shown and described, it is to be understood that many changes and modifications may be made thereunto without departing from the spirit and scope of the invention.

List of reference numbers

| | |
|---|---|
| 1 | Lance |
| 2 | First additive |
| 3 | Lance body |
| 4 | Handle arrangement |
| 5 | First handle |
| 6 | Second handle |
| 7 | First channel |
| 8 | First channel inlet |
| 9 | First channel outlet |
| 10 | Feed line |
| 11 | First actuating means arrangement |
| 12 | First actuating means |
| 13 | First container |
| 14 | Removal opening |
| 15 | Second channel |
| 16 | Second channel inlet |
| 17 | Second channel outlet |
| 18 | Nozzle arrangement |
| 19 | First nozzle body |
| 20 | Second nozzle body |
| 21 | First inlet opening |
| 22 | Second inlet opening |
| 23 | Outlet opening |
| 24 | Mixing chamber |
| 25 | Longitudinal axis |
| 26 | Third channel |
| 27 | Third channel inlet |
| 28 | Third channel outlet |
| 29 | Second actuating means arrangement |
| 30 | Second actuating means |
| 31 | Control pin |
| 32 | Through hole |
| 33 | First partial channel |
| 34 | Second partial channel |
| 35 | Deflection body |
| 36 | Actuating means group |
| 37 | First actuator member |
| 38 | Second actuator member |
| 39 | Breakthrough |
| 40 | Container opening |
| 41 | Filter element |
| 42 | Third actuating means |
| 43 | Pivot arrangement |
| 44 | Fill opening |
| 45 | Further additive |
| 46 | Further container |
| 47 | Fourth channel |
| 48 | Switching member |
| 49 | Pressure source |
| 50 | Stop element |
| 51 | Separating member |

The invention claimed is:

1. A lance for dispensing a pressurized fluid or a mixture of the pressurized fluid and an additive, the lance comprising:

a lance body, a handle arrangement, which handle arrangement is arranged or formed on the lance body and comprises a first handle and a second handle, wherein the first handle and the second handle are arranged at a distance from one another in a direction along a longitudinal extension of the lance body, and wherein each of the first handle and the second handle can each be grasped separately by one hand of a user for operating the lance, a with a first channel inlet and a first channel outlet, wherein the first channel inlet is connectable to a feed line of the pressurized fluid, a first actuating means arrangement, which first actuating means arrangement is arranged in a surrounding area of the first handle of the handle arrangement, and comprises a first actuating means that is in direct operative connection to the first channel, wherein the first actuating means is adjustable from a locked position to a flow position and vice versa in order to adjust a flow of the pressurized fluid through the first channel, a first container with a removal opening, wherein the first container is configured to accommodate the additive, a second channel with a second channel inlet and a second channel outlet, wherein the second channel inlet is flow-connected to the removal opening of the first container, a second actuating means arrangement, which second actuating means arrangement comprises a second actuating means, wherein the second actuating means is adjustable from a closed position into a release position and vice versa in order to adjust a flow of the first additive through the second channel, a nozzle arrangement with a first nozzle body, wherein a first inlet opening, a second inlet opening, an outlet opening (23), and a mixing chamber are formed or arranged in the first nozzle body, and wherein the first inlet opening and the second inlet opening open into the mixing chamber, and the mixing chamber is flow-connected to the outlet opening, wherein the first channel outlet of the first channel is flow-connected to the first inlet opening of the first nozzle body, wherein the second channel outlet of the second channel is flow-connected to the second inlet opening of the first nozzle body, wherein the second actuating means arrangement comprises a control pin, which control pin is mounted on the lance body so as to be pivotable about a longitudinal axis of the control pin, and the second handle of the handle arrangement is rotationally coupled to the control pin of the second actuating means arrangement and the second handle and the control pin are jointly pivotable about the longitudinal axis of the control pin, wherein the second actuating means of the second actuating means arrangement is arranged in the control pin, wherein a third channel with a third channel inlet and a third channel outlet is provided, and the third channel inlet is flow-connected to an outer environment, wherein the first channel and the third channel are arranged or formed in the lance body, wherein the third channel outlet of the third channel is directly flow-connected to the first inlet opening of the first nozzle body, wherein the second actuating means of the second actuating means arrangement is in direct operative connection to the third channel, and the second actuating means arrangement is arranged in a surrounding area of the second handle, wherein the third channel is continuously opened between the third channel inlet and its the third channel outlet when the second actuating means is in the release position, and thus, a flow of air from the environment through the third channel to the mixing chamber enabled, wherein in an operating mode, the third channel is closed between the third channel inlet and the third channel outlet when the second actuating means is in the closed position, and thus, a flow of air from the environment through the third channel to the mixing chamber is prevented, and in the operating mode, the first additive is drawable into the mixing chamber from the first container via the second channel, wherein the first channel comprises a first partial channel and a second partial channel in a longitudinal section of the first channel between the second actuating means arrangement and the first channel outlet, and wherein the first partial channel is arranged inside the second partial channel.

2. The lance according to claim 1, wherein the second channel is formed by a separate connecting line, and the separate connecting line is arranged so as to extend outside of the lance body or inside the lance body.

3. The lance according to claim 1, wherein the second actuating means of the second actuating means arrangement is formed by a through hole which passes through the control pin in a radial direction of the control pin.

4. The lance according to claim 1, wherein the second actuating means arrangement further comprises a third actuating means in direct operative connection to the second channel, wherein the third actuating means is adjustable from a closed position into a release position and vice versa in order to adjust a flow of the first additive through the second channel.

5. The lance according to claim 4, wherein the third channel is closed when the second actuating means is in the closed position and the third actuating means is in the release position, and the second channel is continuously opened, or wherein the third channel is continuously opened when the second actuating means is in the release position and the third actuating means is in the closed position and the second channel is closed.

6. The lance according to claim 4, wherein the second actuating means and the third actuating means of the second actuating means arrangement are arranged at a distance from each other in an axial direction of the control pin and are arranged offset from each other when viewed in a circumferential direction.

7. The lance according to claim 1, further comprising a second nozzle body arranged upstream in a flow direction of the pressurized fluid through of the first nozzle body, and the first channel outlet of the first channel is arranged or formed in the second nozzle body.

8. The lance according to claim 7, wherein the third channel is also arranged or formed in the second nozzle body.

9. The lance according to claim 1, wherein the first nozzle body of the nozzle arrangement is removably held on the lance body.

10. The lance according to claim 9, wherein, when the first nozzle body is removed, the third channel is closed and the second actuating means is in the closed position, a flow connection between the first channel and the first partial channel is interrupted via the first actuator member, and simultaneously, a flow connection between the first channel and the second partial channel is established via the second actuator member.

11. The lance according to claim 1, wherein the first partial channel ends before the first channel outlet, as viewed in an axial direction of the first channel, and opens into the second partial channel surrounding the first partial channel, and at least an end section of the first partial channel is arranged with respect to the first channel outlet in an aligning orientation thereto.

12. The lance according to claim 1, wherein the second actuating means arrangement further comprises an actuating means group with a first actuator member and a second actuator member, wherein the first actuator member and the second actuator member are in direct operative connection to the first channel.

13. The lance according to claim 12, wherein the first actuator member and the second actuator member are each formed by a breakthrough passing through the control pin in a radial direction of the control pin.

14. The lance according to claim 12, wherein the first actuator member and the second actuator member are arranged at a distance from each other in an axial direction and circumferentially offset to each other, by an offset angle, from each other when viewed in a circumferential direction, and an optional selection of one of either the first actuator member or the second actuator member at a time enables a flow of the pressurized fluid possible.

15. The lance according to claim 12, wherein the first actuator member of the actuating means group is in direct operative connection to the first partial channel, and the second actuator member of the actuating means group is in direct operative connection to the second partial channel.

16. The lance according to claim 12, wherein the third channel is closed when the second actuating means is in the closed position, and simultaneously, a flow connection between the first channel and the first partial channel is established via the first actuator member, and a flow connection between the first channel and the second partial channel is interrupted via the second actuator member.

17. The lance according to claim 1, wherein the third channel is continuously opened when the second actuating means is in the release position, and simultaneously, a flow connection between the first channel and the first partial channel is established via the first actuator member, and a flow connection between the first channel and the second partial channel is interrupted via the second actuator member.

18. The lance according to claim 12, further comprising a further container and wherein the second actuating means arrangement further comprises a third actuating means, wherein, in a first operating position of the second actuating means arrangement, the third actuating means and the first actuator member of the actuating means group are each in a respective release position, the second actuating means is in the closed position, and the third channel is closed, and wherein, in a second operating position of the second actuating means arrangement, the first actuator member of the actuating means group and the second actuating means are each in a respective release position, the third actuating means is in the closed position, and the second channel is closed.

19. The lance according to claim 1, further comprising a further container for accommodating a further additive in the further container, wherein the further container is flow-connected to the second actuating means arrangement and further flow-connected to the third channel via a fourth channel.

20. The lance according to claim 19, wherein at least one of the first container and the further container is removably held on the lance body.

21. The lance according to claim 1, further comprising a pivot arrangement which is configured to hold the first container so as to be pivotable on the lance body.

22. The lance according to claim 1, further comprising a container opening which opens into a container interior of the first container.

23. The lance according to claim 22, wherein the container interior is flow-connected to an outer environment via the container opening, and a filter element is arranged in the container opening.

24. The lance according to claim 1, wherein the additive is selected from a group consisting of a solid granulate material, an extinguishing powder, an extinguishing additive, a foaming agent, dry ice, and a decontamination agent.

* * * * *